May 26, 1953 — H. E. GINDER — 2,639,622
DRIVING BELT
Filed May 11, 1950 — 2 Sheets-Sheet 1
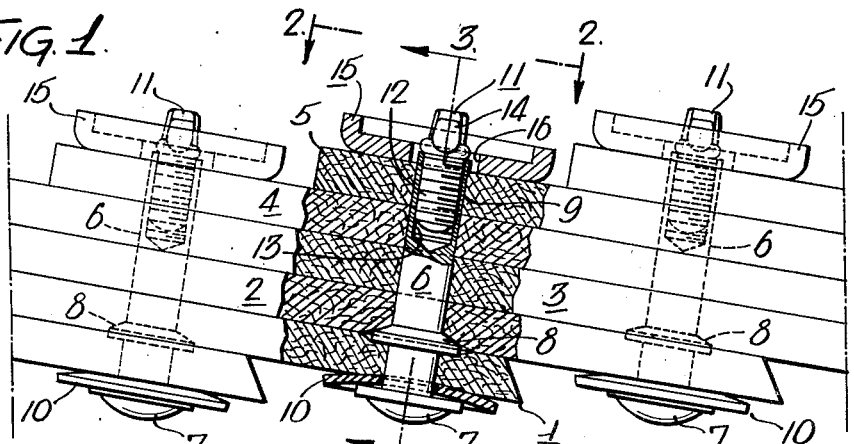
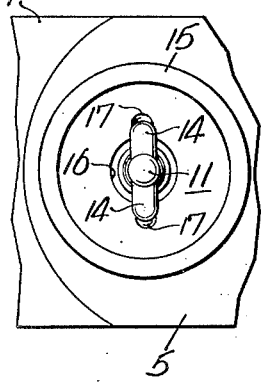
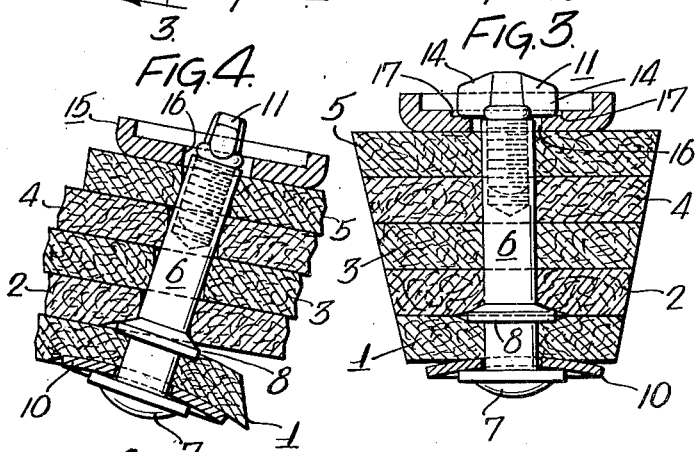
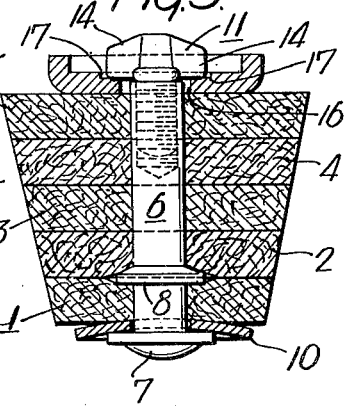
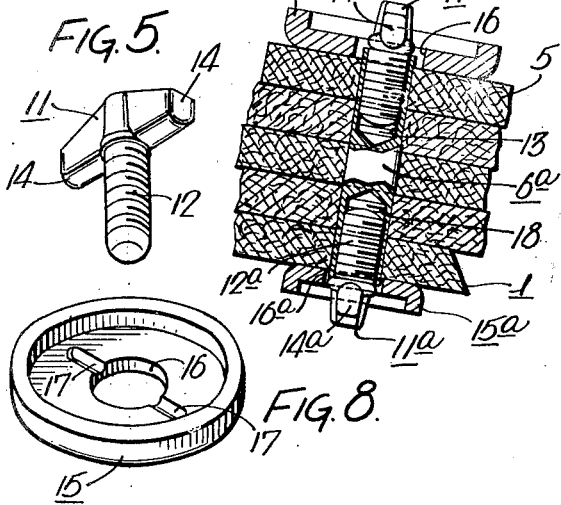
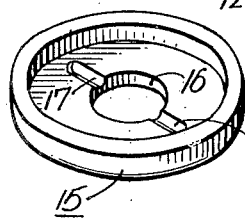
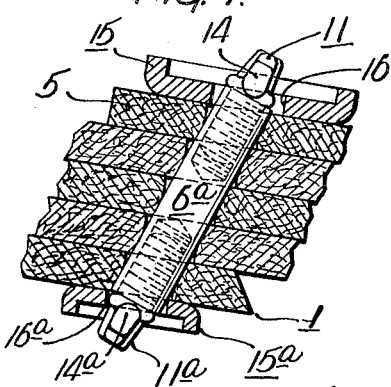
Inventor:
Henry E. Ginder
by his Attorneys
Howson & Howson May 26, 1953     H. E. GINDER     2,639,622
DRIVING BELT
Filed May 11, 1950     2 Sheets-Sheet 2
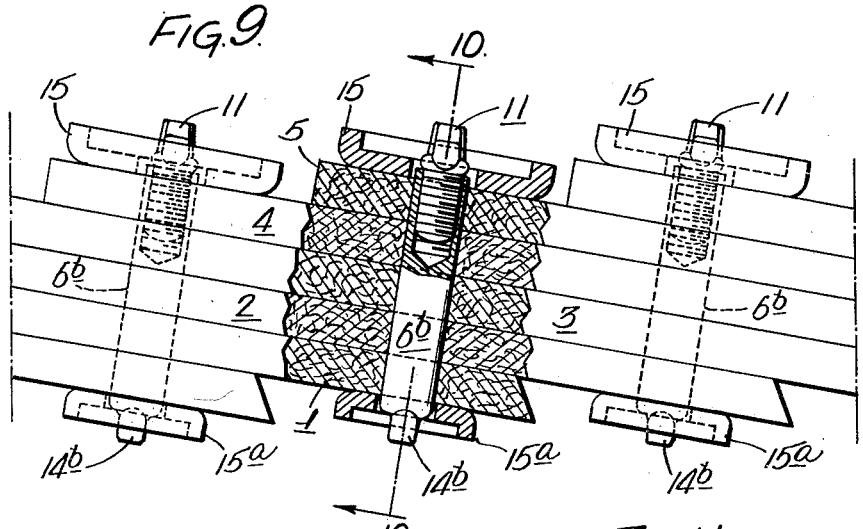
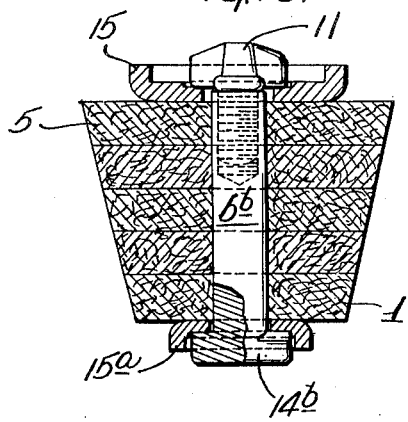
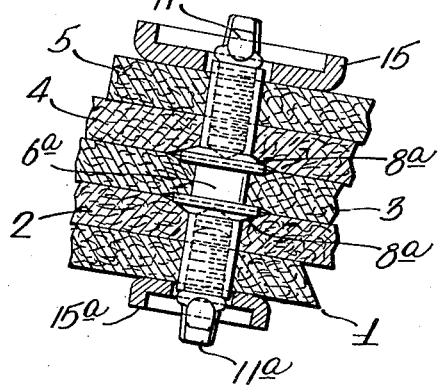
Inventor:
Henry E. Ginder
by his Attorneys
Howson &
Howson Patented May 26, 1953

2,639,622

UNITED STATES PATENT OFFICE 2,639,622

DRIVING BELT

Henry E. Ginder, Manheim, Pa., assignor to Manheim Manufacturing and Belting Company, Manheim, Pa., a corporation of Pennsylvania Application May 11, 1950, Serial No. 161,360

10 Claims. (Cl. 74—233)

This invention relates to new and useful improvements in driving belts, and more particularly to driving belts of the type comprising a number of superimposed links secured together by suitable fastening means which pass through openings formed in the links, this application being a continuation in part of my application, Serial No. 78,123, filed February 24, 1949 for Driving Belts, now abandoned.

In belts of the type under consideration, flexible links are provided having a plurality of holes therein and a headed stud is secured at one end of each link. The links are assembled in well known manner by passing the headed studs through the openings in adjacent links until a desired length of belting is formed. When belting of this type is placed under tension the studs tend to assume an inclined position with the result that the adjacent links are bent or flexed over the edge of the stud heads, thereby structurally weakening the links so that they break prematurely. In addition, in prior belts of this type the assembly and disassembly of the belt, or the addition and removal of links, is made arduous and time consuming by reason of the manner in which the several links are secured and retained in superimposed relation upon each of the studs or fastening means, and furthermore, in most cases the construction is such that the securing means is constructed to bear and bite against the links when the belt is tensioned.

With the foregoing in mind the principal object of the present invention is to provide in a belt of the type described novel fastening means which is constructed and arranged to prevent sharp angle flexure or bending of the links with resultant rapid wear and premature breaking of the links.

Another object of the invention is to provide new and improved constructions and arrangements for securing the several links of the belt in their relatively superimposed position comprising novel bearing members and studs constructed so that the bearing members pivot angularly with respect to the studs and remain in a position parallel to the belt links when the belt is tensioned and the studs assume an inclined position as described.

Another object of the invention is to provide novel securing means as set forth which is constructed and arranged to provide relatively rapid and easy assembly and disassembly of the several links of the belt to and from the studs or fasteners.

A further object of the invention is to provide constructions in accordance with the foregoing objects which are comparatively inexpensive to manufacture, are entirely foolproof and highly efficient and effective in operation and use, and provide a belt of considerably greater strength and durability than prior link belt constructions of corresponding dimensions.

These and other objects of the invention and the various features and details of the construction and operation thereof are hereinafter fully set forth and described with reference to the accompanying drawings in which:

Fig. 1 is a side elevational view of a portion of a belt embodying the present invention, a portion thereof being shown in section to better illustrate certain features and details of the invention;

Fig. 2 is a view taken on line 2—2, Fig. 1;

Fig. 3 is a sectional view on line 3—3, Fig. 1;

Fig. 4 is a view similar to Fig. 3 showing the relative position of the belt links and fastening means when the belt is placed under tension;

Fig. 5 is a view in perspective of one of the securing elements of the present invention;

Fig. 6 is a fragmentary sectional view showing a stud or fastener construction embodying a modified form of securing means;

Fig. 7 is a view of the construction shown in Fig. 6 illustrating the component parts of the construction in the relative positions assumed thereby when the belt is placed under tension;

Fig. 8 is a detached view in perspective of a bearing member made in accordance with the present invention;

Fig. 9 is a side elevational view of a portion of still another modified form of belt, a portion being shown in section to illustrate certain details of construction;

Fig. 10 is a sectional view on line 10—10, Fig. 9; and

Fig. 11 is a fragmentary sectional view vertically through a belt showing a modified construction of the fastener stud.

Referring now more particularly to Fig. 1 of the drawings there is shown a portion of a driving belt which is composed of a plurality of relatively superimposed links 1, 2, 3, 4 and 5 respectively, held together by studs or fasteners 6, each having a head 7 and a shoulder 8, the head 7 and shoulder 8 being spaced apart and securely clamping therebetween one end of the inner or lowermost link 1. The shank 9 of each stud 6 extends upwardly or outwardly through registering openings in the several superimposed links associated therewith. As shown, there is interposed between the head 7 of each stud and the adjacent surface of the link 1 a washer or like member 10.

According to this embodiment of the invention the relatively superimposed links of the belt are held in position upon the shanks 9 of the studs 6 by means of a screw member 11 (see Fig. 5) having a threaded shank portion 12 which is adapted to be screwed into the upper or free end of the stud shank 9 which is bored and tapped as indicated at 13. The member 11 is provided with arm portions 14 extending at diametrically opposite directions and adapted, when the member 11 is screwed into the tapped opening 13 in the stud shank 9, to engage upon the outer face of an underlying bearing member 15. These bearing members 15 are in the general form of washers and have openings 16 therethrough for the free end portions of the stud shanks 9.

The arm portions 14 of the securing members 11 rockably engage upon the upper surface of the bearing members 15 and it is to be noted that the openings 16 in the latter have a diameter larger than the diameter of the shanks 9 and the shanks 6 in order to provide adequate clearance between the stud shanks 9 and bearing members 15 to permit the latter to rock or pivot angularly with respect to said studs. By this construction when the belt is tensioned and the studs 6 assume an inclined position as described and shown in Fig. 4 of the drawings, the fastening means arm portions 14 rockably bear upon the underlying bearing members 15 thereby permitting the studs 6 to be displaced angularly while the said bearing members continue to maintain a position parallel to the underlying belt links 5. In this manner the securing means 11 and the bearing members 15 are prevented from biting into the links when the studs 6 become angularly inclined under tension on the belt.

In order to maintain the securing members 11 in position transversely of the belt and prevent said members from working loose and becoming unscrewed while the belt is in use, the outer faces of the bearing members 15 may be provided with diametrically arranged elongated recesses 17 to receive and retain against accidental displacement of the projecting arm portions 14 of the securing members 11. It is not necessary that the bearing members 15 be employed in the generally dished form illustrated in the drawings and substantially flat bearing members may be used as desired. However, a dished form of bearing member illustrated and described herein provides a bearing member characterized by a high degree of rigidity and durability in use of the belt.

An alternate construction and arrangement for securing the elements of the belt together is shown in Figs. 6 and 7 of the drawings. In this construction, in lieu of utilizing studs 6 having rigid integral heads 7 and shoulder portions 8, as in the form of invention previously described, a headless stud 6a may be utilized which is bored and tapped as indicated at 18, at its lower end to receive the threaded portion 12a of a securing member 11a, said securing member 11a having diametrically projecting arm portions 14a which are adapted to bear upon the outer surface of a bearing member 15a having an opening 16a therein for the studs 6a of sufficient diameter with respect to the stud diameter to permit the fastening member 11a to rockably bear upon the bearing member 15a so that the latter maintains a position parallel to the adjacent belt link 1 when the belt is tensioned and the studs 6a assume an inclined position, for example, as shown in Fig. 7 of the drawings. As in the case of the bearing members 15, the bearing members 15a may be recessed to receive and retain the inner edge portions of the arms 14a of the fastening member 11a.

By this construction the fastening means at both the inner and outer sides of the belt are mounted to rockably bear upon the underlying bearing members 15 and 15a respectively so that when the belt is tensioned and the studs assume an inclined position as described, the fastening members 11 and 11a are caused to rockably bear upon the adjacent surfaces of the bearing members 15 and 15a so that the bearing members maintain a position parallel to the adjacent belt links 5 and 1 respectively at both the outer and inner sides of the belt.

Still another form of the invention is shown in Figs. 9 and 10 of the drawings wherein, in lieu of utilizing a detachable threaded securing member 11a at the bottom or inner side of the belt a stud 6b may be employed having at its lower or inner end a cross member or portion 14b which is formed integrally with the stud 6b and functions correspondingly to the arm portions 14a of the detachable threaded securing members 11a.

In this particular form of the invention the integral cross member 14b of the studs 6b is adapted to bear rockably against the adjacent surface of the bearing members 15a just as in the case of the arm portions 14a of the detachable threaded securing members 11a so that when the belt is tensioned and the stud inclined as described, the bearing members 15 and 15a at the outer and inner sides of the belt are maintained in positions parallel to the belt links in the manner and for the purpose previously described.

A further embodiment of the invention is shown in Fig. 11 of the drawings and relates particularly to the form of the invention shown in Figs. 6 and 7 previously described herein. In the embodiment of Fig. 11 the construction of the studs and the threaded securing members 11 and 11a is the same as that shown and described with respect to Figs. 6 and 7 of the drawings. However, in certain instances and particularly in the case of belts of the larger sizes designed for heavy duty work, it may be desirable to securely anchor the studs 6a to the central links 3 of the belt. This may be accomplished as shown in Fig. 11 of the drawings by providing on the studs 6a relatively spaced collar or shoulder elements 8a which are fixedly secured upon the studs 6a in firmly gripping relation at opposite sides of the central belt links 3 so that the latter are clamped between said collars or shoulders 8a and thereby fixedly secured to the studs 6a. By thus anchoring the studs 6a to the central links 3 of the belt, the studs are anchored to the belt along the median line thereof so that tension stresses are applied along the central axis of the belt and substantially evenly distributed throughout the adjacent portions of the belt.

While certain embodiments of the present invention have been illustrated and described herein, it is not intended to limit the invention to such disclosures, and changes and modifications may be incorporated and embodied therein within the scope of the following claims.

I claim:

1. In a laminated driving belt comprising a plurality of links arranged in superimposed relation, fastening elements to secure said links together each having a shank portion extending through the overlapping portions of the links, bearing members disposed about one end of each fastener shank engaging the adjacent link, and securing means removably engaged with one end of each fastener shank and engaging said bearing members to prevent displacement of the links, said bearing members having an opening for the shank providing clearance for angular movement of the shanks relative to the bearing members upon deflection of the shank when the belt is placed under tension so that the securing means are caused to rock upon said bearing members which remain parallel to the adjacent belt links.

2. In a laminated driving belt comprising a plurality of links arranged in superimposed relation, fastening elements to secure said links together each having a shank portion extending through the overlapping portions of the links, a bearing member disposed about one end of each fastener shank and engaging the adjacent link, and securing means threaded into one end of each fastener shank and having projecting portions engaging said bearing members to prevent displacement of the links from the shanks, said bearing members having an opening for the shank providing clearance for angular movement of the shanks relative to the bearing members upon inclination of the shanks when the belt is placed under tension so that the securing means are caused to rock upon said bearing members which remain parallel to the adjacent belt links.

3. In a laminated driving belt comprising a plurality of links arranged in superimposed relation, fastening elements to secure said links together each having a shank portion extending through the overlapping portions of the links, a bearing member disposed about one end of each fastener shank and engaging the adjacent link, and securing means threaded into one end of each fastener shank and having projecting portions engaging said bearing members to prevent displacement of the links from the shanks, said bearing members having an opening for the shank providing clearance for angular movement of the shanks relative to the bearing members upon inclination of the shanks when the belt is placed under tension so that the securing means are caused to rock upon said bearing members which remain parallel to the adjacent belt links, and the said bearing members having recesses therein to receive and normally retain said projecting portions of the securing means.

4. In a laminated driving belt comprising a plurality of links arranged in superimposed relation, fastening elements to secure said links together each having a shank portion extending through the overlapping portions of the links, bearing members disposed about the opposite ends of each fastener shank and engaging the adjacent links, and securing means threaded into the opposite ends of each fastener shank and having projecting portions engaging said bearing members to prevent displacement of the links from the shanks, said bearing members having an opening for the shank providing clearance for angular movement of the shanks relative to the bearing members upon inclination of the shanks when the belt is placed under tension so that the securing means are caused to rock upon said bearing members which remain parallel to the adjacent belt links, and the said bearing members having recesses therein to receive and normally retain said projecting portions of the securing means.

5. In a laminated driving belt comprising a plurality of links arranged in superimposed relation, fastening elements to secure said links together each having a shank portion extending through the overlapping portions of the links, a bearing member disposed about one end of each fastener shank and engaging the adjacent link, a cross member at said one end of each shank integral therewith and engaging said bearing member to prevent displacement of the links, a second bearing member disposed about the other end of each shank and engaging the adjacent link, and securing means removably engaged with said other end of the fastener shank and engaging said bearing member to prevent displacement of the links, said bearing members having an opening for the shank providing clearance for angular movement of the shanks relative to the bearing members upon inclination of the shanks when the belt is placed under tension so that said securing means is caused to rock upon said bearing members which remain parallel to the adjacent belt links.

6. In a laminated driving belt comprising a plurality of links arranged in superimposed relation, fastening elements to secure said links together each having a shank portion extending through the overlapping portions of the links, a bearing member disposed about one end of each fastener shank and engaging the adjacent link, a cross member at said one end of each shank integral therewith and engaging said bearing member to prevent displacement of the links, a second bearing member disposed about the other end of each shank and engaging the adjacent link, and securing means threaded into the said other end of each fastener shank and having projecting portions engaging said bearing member to prevent displacement of the links from the shank, said bearing members having an opening for the shank providing clearance for angular movement of the shanks relative to the bearing members upon inclination of the shanks when the belt is placed under tension so that said cross member and securing means are caused to rock upon said bearing members which remain parallel to the adjacent belt links.

7. In a laminated driving belt comprising a plurality of links arranged in superimposed relation, fastening elements to secure said links together each having a shank portion extending through the overlapping portions of the links, a bearing member disposed about one end of each fastener shank and engaging the adjacent link, a cross member at said one end of each shank integral therewith and engaging said bearing member to prevent displacement of the links, a second bearing member disposed about the other end of each shank and engaging the adjacent link, and securing means threaded into the said other end of each fastener shank and having projecting portions engaging said bearing member to prevent displacement of the links from the shank, said bearing members having an opening for the shank providing clearance for angular movement of the shanks relative to the bearing members upon inclination of the shanks when the belt is placed under tension so that said cross member and securing means are caused to rock upon said bearing members which remain parallel to the adjacent belt links, and the said bearing members having recesses therein to receive and normally retain the said cross members and projecting portions of said securing means.

8. In a laminated driving belt comprising a plurality of links arranged in superimposed relation, fastening elements to secure said links together each having a shank portion extending through the overlapping portions of the links, a bearing member about one end of the fastener shank and engaging the adjacent link, and securing means removably engaged with the fastener shank and engaging said bearing member to prevent displacement of the links, said bearing member having an opening for the shank of greater diameter than the shank to provide clearance for relative angular movement of the shank and bearing member so that upon inclination of the shank when the belt is placed under tension the securing means are caused to rock upon said bearing member which remains parallel to the adjacent belt link.

9. In a laminated driving belt comprising a plurality of links arranged in superimposed relation, fastening elements to secure said links together each having a shank portion extending through the overlapping portions of the links, means firmly anchoring an intermediate one of said links to each fastener shank, bearing members disposed about the opposite ends of each fastener shank and engaging the adjacent link, and securing means removably engaged with the opposite ends of each fastener shank and engaging said bearing member to prevent displacement of the links, said bearing members having an opening for the shank providing clearance for angular movement of the shanks relative to the bearing members upon inclination of the shanks when the belt is placed under tension so that the securing means are caused to rock upon said bearing members which remain parallel to the adjacent belt links.

10. In a laminated driving belt comprising a plurality of links arranged in superimposed relation, fastening elements to secure said links together each having a shank portion extending through the overlapping portions of the links, spaced shoulder elements on each fastener shank firmly gripping therebetween an intermediate one of said links, bearing members disposed about the opposite ends of each fastener shank and engaging the adjacent link, and securing means removably engaged with said opposite ends of each fastener shank and engaging said bearing member to prevent displacement of the links, said bearing members having an opening for the shank providing clearance for angular movement of the shanks relative to the bearing members upon inclination of the shanks when the belt is placed under tension so that the securing means are caused to rock upon said bearing members which remain parallel to the adjacent belt links.

HENRY E. GINDER.

References Cited in the file of this patent

UNITED STATES PATENTS

| Number | Name | Date |
|---|---|---|
| 63,497 | Frank | Apr. 2, 1867 |
| 1,352,918 | Rohbock | Sept. 14, 1920 |
| 2,249,726 | Brammer | July 22, 1941 |

FOREIGN PATENTS

| Number | Country | Date |
|---|---|---|
| 522,259 | Great Britain | June 13, 1940 |